United States Patent Office 2,938,045
Patented May 24, 1960

2,938,045

PROCESS FOR MAKING COPPER PENTACHLOROPHENATE

Charles Parkes Matzinger, Berkeley, Calif., assignor to The Mountain Copper Company, Ltd., a corporation of Great Britain No Drawing. Filed June 2, 1959, Ser. No. 817,469

9 Claims. (Cl. 260—439)

This invention relates to a method of making copper-pentachlorophenate by a novel method, and also a novel form of pentachlorophenate which is more effective as a fungicide than copper pentachlorophenate made in the conventional manner. The copper pentachlorophenate is formed as a slurry which is easily dispersed for use as a fungicide. As a gel, the copper pentachlorophenate contains no impurities other than water and alcohol.

It has heretofore been the practice to manufacture copper pentachlorophenate by reacting copper sulfate with an alkali metal salt of pentachlorophenol such as sodium pentachlorophenol. This reaction results in the production of an undesirable salt, namely the sulfate of the alkali metal, which leads to difficulties in further processing and use of the copper pentachlorophenate. Further, the salt may "bloom" when the copper pentachlorophenate is used, and may injure plants.

It is an object of the present invention to provide a method for making copper pentachlorophenate wherein the only reaction products are copper pentachlorophenate and water.

Another object of this invention is to provide a process for the manufacture of copper pentachlorophenate wherein the copper pentachlorophenate is produced in the form of a paste or gel, which consists of extremely finely divided particles of pentachlorophenate and which is very effective as a fungicide.

In general, the objects of the present invention are accomplished by reacting pentachlorophenol with copper hydroxide in the presence of alcohol, whereby there is first produced an alcoholic solution of copper pentachlorophenate and thereafter diluting said solution with water whereby the copper pentachlorophenate is precipitated from the alcohol solution in extremely finely divided form. Although stoichiometric amounts may be used, a slight precipitate may be formed and it is preferred to operate with about a 5% excess of pentachlorophenol.

A number of alcohols have been tested for use as solvents in the process of this invention and the lower alkyl alcohols (ROH where R is lower alkyl) were the only ones tested which were found to be satisfactory. Methyl alcohol, ethyl alcohol and isopropyl alcohol are all satisfactory, but ethanol has provided the best solution of copper pentachlorophenate. The aromatic alcohols, including toluol and xylol, were tested and found to produce unsatisfactory solutions. Polyglycol and hexylene glycol produced a solution, but bridged the solution with water so well that the copper pentachlorophenate would not precipitate completely even though much water was used and considerable time allowed. Various cheaper organic solvents, such as benzene, stove oil and kerosene, have also been tested and were found to be unsatisfactory.

Various working examples are set forth below for illustrative purposes.

*Example 1.*—The following quantities of reactants were used:

1236 grams pentachlorophenol (95% pure)
216 grams cupric hydroxide (63.5% Cu)
2 liters ethanol.

The procedure was as follows: The alcohol was first used to dissolve the pentachlorophenol and thereupon copper hydroxide was added slowly, while the alcoholic solution was agitated until the copper hydroxide was completely dissolved to produce a clear, deep dark purple solution of copper pentachlorophenate in alcohol. The solution thus produced was poured into 12 liters of water and agitation was continued. This produced an insoluble slurry of copper pentachlorophenate which, after standing, formed a thixotropic gel-like product. The gel is ideal for use as a fungicide, since it may be diluted with water and easily forms a good dispersion.

*Example 2.*—Following the procedure outlined in Example 1 above, so as to provide an opportunity for direct comparison of results, two liters of methanol were used to dissolve 1236 grams pentachlorophenol and 216 grams cupric hydroxide. The pentachlorophenol, as in Example 1, was mixed with the alcohol and the copper hydroxide added slowly thereafter. During this time, the alcohol was agitated. The copper hydroxide dissolved completely to produce a clear, deep dark purple solution of copper pentachlorophenate in alcohol. The solution thus produced was poured into 12 liters of water and agitation was continued. An insoluble slurry of copper pentachlorophenate formed, and eventually the thioxtropic gel-like product, described in Example 1 above, was obtained.

*Example 3.*—Following as closely as possible procedures outlined above, excepting that isopropyl alcohol was substituted for the alcohols previously used, the entire process was repeated. A quantity of 1236 grams pentachlorophenol was first dissolved in 2 liters of isopropyl alcohol and 216 grams cupric hydroxide added with agitation of the alcohol solution. The clear, purple solution formed as the copper hydroxide was added and the solution obtained was poured into 12 liters of water and agitation continued. An insoluble slurry of copper pentachlorophenate formed, followed by the thixotropic, gel-like product described in Example 1.

Methanol and isopropyl alcohol proved to be somewhat less satisfactory solvents and solutions made with these materials were not as stable over an extended period of time as was the ethanol solution. All three alcohols were used in excess over the quantities required to just form a saturated solution whereby to improve the ease of solution.

The product produced in accordance with the present invention may be used in a variety of ways. It has been tested as a fungicide for the preservation of wood and has been found to be extremely effective for this purpose.

This application is a continuation-in-part of co-pending application Serial No. 521,629, filed July 12, 1955, for Process for Making Copper Pentachlorophenate, now abandoned.

I claim:

1. A process for preparing copper pentachlorophenate in a relatively pure form which comprises: forming a solution of pentachlorophenol in alcohol of the general formula ROH, wherein R is lower alkyl, and adding thereto an amount of cupric hydroxide, agitating the mixture so formed whereby to dissolve said cupric hydroxide and thereafter to produce copper pentachlorophenate and water as the sole reaction products.

2. The process of claim 1 wherein the pentachlorophenol is initially present in a slight stoichiometric excess relative to the cupric hydroxide.

3. The process of claim 1 wherein R is ethyl.

4. The process of claim 1 wherein R is methyl.

5. The process of claim 1 wherein R is isopropyl.

6. A process for preparing copper pentachlorophenate in a relatively pure form which comprises: forming a solution of pentachlorophenol in an alcohol of the general formula ROH, where R is lower alkyl, and adding thereto an amount of cupric hydroxide, agitating the mixture so formed whereby to dissolve said cupric hydroxide and thereafter to produce copper pentachlorophenate and water as the sole reaction products, thereafter adding thereto an excess of water and agitating the mixture so formed whereby to produce an insoluble slurry of copper pentachlorophenate.

7. The process of claim 6 wherein R is ethyl.

8. A gel of copper pentachlorophenate suitable for use as a fungicide after dilution with water comprising: the product of the reaction of pentachlorophenol and cupric hydroxide, said cupric hydroxide being added to an alcoholic solution of said pentachlorophenol, followed by the addition thereto of an excess of water whereby to produce an insoluble slurry which on standing forms a gel, said alcohol being of the general formula ROH, wherein R is lower alkyl.

9. The process of claim 8 wherein R is ethyl.

No references cited.